US005819281A

United States Patent [19]
Cummins

[11] Patent Number: 5,819,281
[45] Date of Patent: Oct. 6, 1998

[54] NOTIFICATION OF ASPECT VALUE CHANGE IN OBJECT-ORIENTED PROGRAMMING

[75] Inventor: Fred A. Cummins, Farmington Hills, Mich.

[73] Assignee: Electronic Data Systems Corporation, Plano, Tex.

[21] Appl. No.: 606,983

[22] Filed: Feb. 26, 1996

[51] Int. Cl.$^6$ .................................................. G06F 17/30
[52] U.S. Cl. ............................. 707/103; 707/2; 395/702; 395/683
[58] Field of Search .............................. 395/614, 200.51, 395/617, 500, 702, 683; 707/2, 103

[56] References Cited

U.S. PATENT DOCUMENTS

| 5,291,583 | 3/1994  | Bapat           | 395/614    |
| 5,410,681 | 4/1995  | Jennsen et al.  | 395/500    |
| 5,471,629 | 11/1995 | Risch           | 395/617    |
| 5,504,892 | 4/1996  | Atsatt et al.   | 395/614    |
| 5,548,726 | 8/1996  | Pettus          | 395/200.51 |
| 5,675,801 | 10/1997 | Lindsey         | 395/702    |
| 5,680,616 | 10/1997 | Williams et al. | 707/103    |
| 5,737,606 | 4/1998  | Cummins         | 395/683    |

OTHER PUBLICATIONS

Bacon et al. "Using Events to Build Distributed Applications", Services in Distributed and Networked Environments, 1995 2nd Int'l Workshop, pp. 148–155, 1995.

Menon et al. "Object Replacement Using Dynamic Proxy Updates", Configurable Distributed Systems, 1994 Int'l Workshop, pp. 82–91, 1994.

Menon et al. "Asynchronous Event Handling in Distributed Object–Based Systems", Distributed Computing Systems, 1993 Int'l Conf., pp. 383–390, 1993.

Ibrahim et al. "KSL/Logic: Integration of Logic with Objects", Computer Languages, 1990 Int'l Conf., pp. 229–235, 1990.

Tripathi et al. "An Implementation of the Object–Oriented Concurrent Programming Language SINA", Software–Pactice and Experience, v. 19(3), pp. 235–256, Mar. 1989.

Keremitsis et al. "HP Distributed Smalltalk: A Tool for Developing Distributed Applications", Hewlett–Packard Journal, v46, n2, p85(8), Apr. 1995.

Ford, Dan "Event–Driven Threads in C++: An Object–Oriented Infrastructure for Multithreaded Apps.", Dr. Dobb's Journal, v. 20, n. 6, p. 48(8), Jun. 1995.

P.A. Bernstein, V. Hadzilacos, N. Goodman, Concurrent Control and Recovery in Database Systems; Addison–Wesley 1987, pp. 1–105.

Fred A. Cummins, *Production System Extensions to KSL;* Object–Oriented and Artificial Intelligence Services, EDS, no date.

Bjorn N. Freeman–Benson, *Kaleidoscope: Mixing Objects, Constraints, and Imperative Programming;* University of Washington, Department of Computer Science and Engineering, Oct. 1990, pp. 88–99.

A. Goldberg and D. Robson; *Smalltalk–80: The Language and its Implementation;* Addison–Wesley (1983), pp. 240–247.

G. Lopez, B. Freeman–Benson, A. Borning; *Implementing Constraint Imperative Programming Languages: The Kaleidoscope '93 Virtual Machine,* 1994; pp. 259–271.

VisualWorks, Rel. 1.0, User's Guide, ParcPlace Systems (1992) pp. 120–122.

(List continued on next page.)

*Primary Examiner*—Thomas G. Black
*Assistant Examiner*—Charles L. Rones
*Attorney, Agent, or Firm*—Ann C. Livingston; L. Joy Griebenow

[57] ABSTRACT

An object-oriented programming language includes support for encapsulation of aspects and for change notification for aspect values. These features are then used to implement various change notification mechanisms. In general, a notification request for change in an aspect value in a target object is forwarded to any object (which may be the same object or another object) having aspects from which the aspect value is computed, derived, or replicated.

17 Claims, 3 Drawing Sheets

OTHER PUBLICATIONS

J.J. Shilling, P.F. Sweeney; *Three Steps to Views: Extending the Object–Oriented Paradigm;* OOPSLA '89 Proceedings; pp. 353–361.

M. Stefik and D.G. Bobrow; *Object–Oriented Programming: Themes and Variations,* The AI Magazine 6(4); 40–62, Winter, 1986.

M. Stefik, D.G. Bobrow and K.M. Kahn; *Integrating Access–Oriented Programming into a Multiparadigm Environment;* IEEE 1986, pp. 10–18.

D. Ungar, R.B. Smith; *Self: The Power of Simplicity;* OOPSLA '87, pp. 227–241.

S. Matsuoka, K. Taura, A. Yonezawa; *Highly Efficient and Encapsulated Re–use of Synchronization Code in Concurrent Object–Oriented Languages;* OOPSLA 1993, pp. 109–126.

S. Habert, Ls. Mosseri; COOL: *Kernel Support for Object–Oriented Environments;* ECOOP/OOPSLA '90 Proceedings, pp. 269–277.

NOTIFICATION OF ASPECT VALUE CHANGE IN OBJECT-ORIENTED PROGRAMMING

TECHNICAL FIELD OF THE INVENTION

The present invention relates to software implementation, and more particularly to mechanisms used in object-oriented programming.

BACKGROUND OF THE INVENTION

Object-oriented programming is rapidly becoming the software industry's preferred method for developing software. Essentially, object-oriented programming is a method of implementing software as components of a system and of constructing systems from these components.

"Objects" are software entities comprising data structures and operations on the structures' data. Objects can model concrete things or abstract ideas, in terms of characteristics or in terms of behavior. A software "object" is a group of elements working together or in succession to perform specific tasks. These elements are data elements, also called instance variables, and functions, also called methods, of the object. Objects are defined by creating "classes", which act as templates that instruct a computer how to construct an actual object. For example, a class may specify the number and type of data variables and the steps involved in methods that manipulate the object. An object created from a certain class is called an "instance" of that class, The class defines the operations and information initially in an instance, while the current state of the instance is defined by operations subsequently performed on it. By analogy to a factory, objects are created by "asking" a class (the factory) to "stamp out" an instance.

The state of an object is represented by the values of its instance variables. The state can be retrieved or updated with accessor methods. Other methods will perform operations associated with an object and may invoke additional methods on the same or other objects.

A basic feature of object-oriented programming is encapsulation of objects. "Encapsulation" means that objects hide (encapsulate) their data's internal structure and the algorithms that implement their actions. Instead of exposing these implementation details, objects present interfaces that represent their abstractions cleanly with no extraneous implementation information.

Because objects are encapsulated, interactions between objects occur by sending messages that invoke methods. Each object has a protocol, that is, it has a set of messages to which the object can respond. The messages are used to invoke the methods defined for the object. Typical messages are from one object to another object or from an object to itself, but an external source such as a user interface might also send messages to, or receive messages from, an object.

SUMMARY OF THE INVENTION

The present invention is directed to using an object-oriented programming language, which supports encapsulated aspects, to implement change notification for aspect values. The programming language supports objects having "encapsulated aspects" as defined herein and supports one or more of the various notification mechanisms described below. In other words, when an object having an aspect is defined, the programming language automatically generates the code that will handle notification requests to the object for changes in the aspect value.

More specifically, one embodiment of the invention is a mechanism for change notification for computed aspect values. A notification request to a target object with a computed aspect value will cause notification requests to be generated to the aspects used in the computation. In compliance with their notification requests, these aspects will send a notification message to the target object, which in turn will send notification messages to the original requester.

A second embodiment of the invention is a mechanism for change notification to an active view. An active view object may be declared with aspect values derived from underlying objects. When the view receives a notification request, the programming language automatically forwards notification requests to the underlying objects.

Other embodiments of the invention are further implementations of change notification for aspect values. They include mechanisms for change notification for replicated data of shared objects in a distributed computing environment and for computed aspect values stored in a database.

DETAILED DESCRIPTION OF THE INVENTION

An underlying premise of the invention is the particular programming language being used supports the use of "encapsulated aspects". Encapsulated aspects incorporate the functionality and data storage associated with an attribute or relationship. An encapsulated aspect includes a method to retrieve its instance variable values. If it has one or more computed values, it includes a method to compute them. Thus, a feature of encapsulated aspects is the implicit definition of methods and a corresponding protocol for the aspect.

Encapsulated Aspects

The following description uses the term "aspects" to mean a conceptual state variable of an object. There are two basic types of aspects: attributes and relationships. Attribute aspects return elementary values. For example, aspects for color, size, name, weight, and marital status are attribute aspects. Relationship aspects return the identity of one or more complex objects.

Both types of aspects have a cardinality characteristic, in that their values can be counted. Thus, an aspect can have a single value or multiple values. Generally, an attribute aspect will have a single value, whereas a relationship aspect will have either a single value or multiple values.

Single-valued aspects will have accessor methods for simple retrievals and updates—with get and put messages. Multi-valued aspects will have accessor methods that access a collection—a get message should return a collection of references, a put message should add a new relationship, and a delete message should remove a specified relationship.

Values of aspects may be stored with an associated instance variable. Or, values may be computed by reference to other aspects and objects. Computed aspects may also have methods for updating a value.

The encapsulation of aspects provides an abstraction that permits the programming language to generate the code associated with an aspect. In other words, the programming language can be made to support the declaration of encapsulated aspects. The object developer can declare the characteristics of an aspect and the compiler (or other component of the programming language) can implement the methods without explicit programming. The use of encapsulated aspects is especially significant in the case of software for modeling business enterprises and solving business problems.

Figure 1:
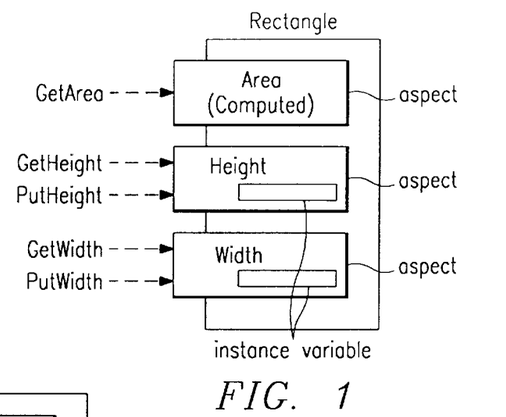
FIG. 1 illustrates an example of an object having encapsulated attribute aspects.

FIG. 1 illustrates an example of an object having encapsulated aspects. The object represents a rectangle and has three attribute aspects: Height, Width, and Area. Height and Width have stored values. Area is computed and cannot be updated directly. However, a method could be defined to cause Area to be updated by updating either or both values of Height and Width.

A computed value, such as that of Area, will have a computation expression. For example, the Area aspect has a computation expression that multiplies the Height value by the Width value to yield the Area value. In addition to providing the computed value, the computation expression implicitly identifies (references) the aspects that are the basis of the computed value.

Figure 2:
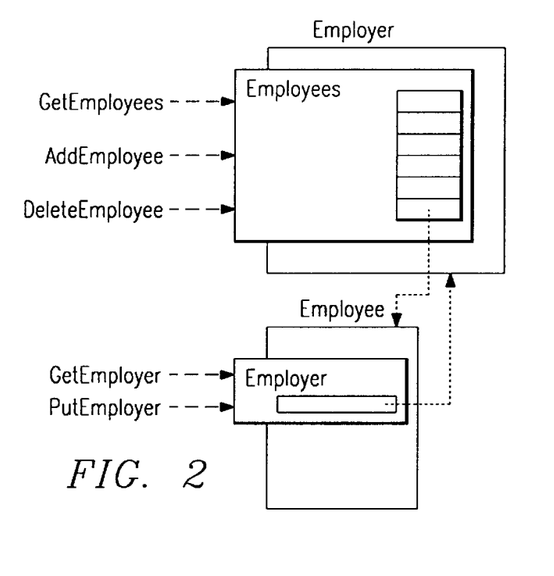
FIG. 2 illustrates an example of an object having encapsulated relationship aspects.

FIG. 2 illustrates another example of objects having encapsulated aspects. These aspects are relationship aspects, specifically, a one-to-many relationship between an Employer object and an Employee object. The Employer object has an Employees aspect, which contains a collection of Employees. The Employee object has an Employer aspect with a single Employer reference. These aspects work together to maintain the referential integrity of the relationship.

The mechanism to maintain a relationship should not be a concern to the object developer. Only the encapsulated code of the aspect should access or update the relationship. Thus, the Employees aspect collection should not be accessible except through aspect methods. When the collection of employees is requested, a copy of the collection must be returned.

In both FIG. 1 and FIG. 2, the objects may receive messages to invoke aspect methods. GetHeight is an example of a message that invokes a method to retrieve a value. PutHeight is an example of a message for invoking a method to change a value. The "Get" and "Put" selectors are for purposes of example—the syntax will depend on the programming language. Also, in this example each aspect has a corresponding method. As an alternative, a "Get" and "Put" message could be directed to the object with a parameter identifying the aspect.

For simplicity of explanation, it should be understood that, in the general sense, messages are sent to and from objects, which have aspects. A message "to" an object that identifies a target aspect might be considered as a message directed to that aspect. Aspects do not exist independently of objects and objects have methods to implement their aspects.

Figure 3:
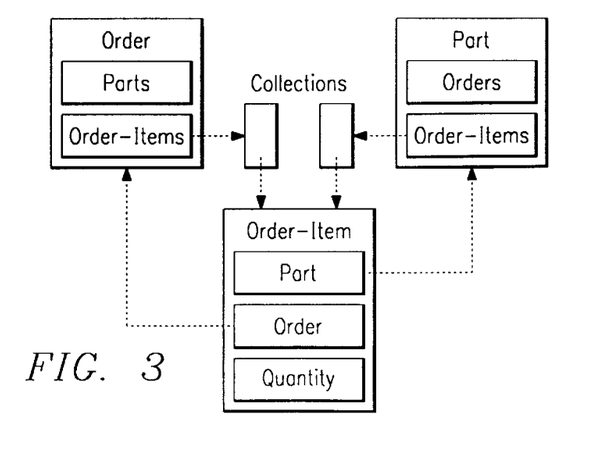
FIG. 3 illustrates an example of a complex relationship, which involves three objects, each having encapsulated aspects.

FIG. 3 illustrates an example of a complex relationship, which involves three classes of objects: Part, Order, and Order-Item. Each object has associated aspects. The association of two principle classes, Part and Order, gives rise to a third class that represents the information incident to the association. In this example, the association of a Part with an Order results in an Order-Item instance that contains the associated quantity. The Order to Part relationship is many-to-many. The Order-Item has a one-to-many relationship with both Order and Part. As indicated by the dotted lines, the relationship between Order and Part is not implemented directly but rather is achieved with references to Order-Item. Thus, Order may have one relationship aspect, Order-Items, implemented as a stored value containing a collection of Order-Items. Order may have another aspect, Parts, implemented as a computed value that returns the Parts specified on the Order-Items. If an Order-Item is deleted from an Order, the referential integrity of the relationship is maintained by deleting the Order-Item reference from the corresponding Part, Thus, encapsulation of aspects ensures that references in all of the associated objects remains consistent.

The encapsulation of aspects with associated aspect methods provides a simple means for extending object-oriented programming to include notification for changed values. As explained below, the object designer can define the desired characteristics of an aspect and the programming language will implement the appropriate functionality for implementing notification.

Notification in General

Notification is activated by a request to a specified object for a specified aspect. Notification provides notice of an event affecting that aspect. The event may be a simple retrieval or it may be a change to the aspect value.

In a change notification, the target object (the recipient of a notification request for a particular aspect) complies with the request by generating a notification message each time the aspect value changes. Depending on the destination specified in the request, the notification message could go to the requester or it could go to some other object.

The most common use of notification is to cause displays to be updated when the underlying problem representation changes Notification can also support rule activation for forward-chaining rule-based systems or can trigger other event-based processing. Additional uses of notification are described below.

Figure 4:
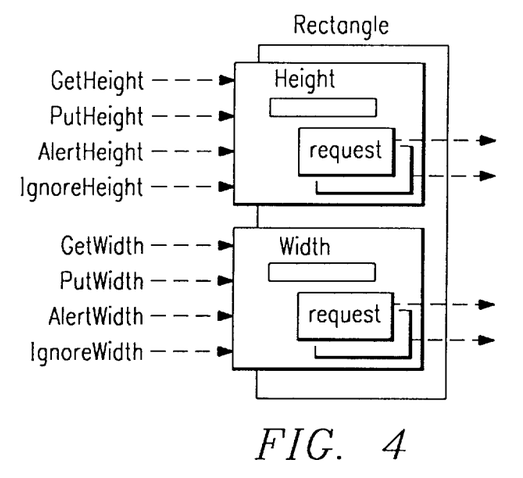
FIG. 4 illustrates examples of notification requests and notification messages associated with encapsulated aspects.

FIG. 4 illustrates examples of notification requests and notification messages. A Rectangle object has two aspects, Height and Width, which have stored values. Two requests are attached to each of these aspects. This is for example—an aspect could have any number of attached requests. As implied by the requests, Rectangle is the target object of notification requests. Whenever a new Height or Width value is assigned, a notification message will be generated for each of the requests associated with that aspect. This service will persist for each request until the request is canceled.

A notification protocol requires two methods: a method to request notification and a method to cancel the request. A request method will cause a notification request to be associated with the aspect. The request will typically be implemented as an object. This notification request object will contain a reference to a notification recipient (the object to receive the notification message) and a parameter that is specified by the notification requester to be passed in the notification message. This parameter often provides the recipient object with information necessary to determine the action to be taken.

In the example of FIG. 4, four messages comprise the aspect protocol. As explained above, the Get and Put messages invoke methods for retrieving and changing values, respectively. "Alert" is an example of a message for attaching a notification request to an aspect. "Ignore" is an example of a message for canceling a notification request.

Once a request is attached, a notification message will be issued each time an event of interest occurs. As an example of operation of notification, suppose an aspect of Rectangle has been the recipient of a notification request. At some later time, it receives an update request message that invokes an update method of the aspect. This results in a change to that aspect value. The update method will then determine that there is a notification request on that aspect. Then, if the request is implemented as an object, the update method might send a message to the request object so that the request object can send a change notification message. Or, the update method might obtain the recipient's identity from the request and send the change notification message itself. Other implementations are also possible.

A notification request method should have qualifiers to specify if notification is to be before or after an operation, and to specify whether the request applies to retrievals, updates, or all activities. The notification message should include both the before and after values of a changed aspect, and it should indicate whether the action was a retrieval or update. The notification message preferably has a standard selector and form so that it can be anticipated by the recipient object. A cancellation message should specify the aspect, the recipient, and the parameter so that the proper request can be identified and removed.

As explained below, the various features of change notification for aspect values provide support for additional capabilities, such as change notification for computed aspect values, notification for aspect values of view objects, notification for aspect values of proxy objects in a distributed computer system, and notification of computed aspect values stored in a database.

Change Notification for Computed Aspect Values

Encapsulated aspects have the capability to provide change notification for aspects with computed values as well as for aspects with stored values. In general terms, change notification for a computed aspect value is implemented by examining the computation expression to determine what aspects are involved in the aspect valuers computation and sending notification requests to those aspects.

More specifically, the value of a computed aspect will change when the value of one of its component variables changes. Thus, a notification message can be generated whenever a stored value used to compute the aspect value is changed. The computation expression used to compute the computed aspect value has message sends that can be used to determine which aspects of which objects are referenced for the computation. Then, when a notification request is received by the target aspect, the references in the computation expression are used to send notification requests to the referenced objects. In this manner, when notification is requested from a computed aspect, that aspect requests notification from each of the referenced aspects (those that the computation depends on).

The values used in an aspect computation may come from accesses to the same object (the target object) or from accesses to other objects These values may themselves be computed values, resulting in another "layer" of notification requests and messages. The target object keeps track of the notification requests for its aspects so that when notification messages are sent to it from referenced aspects, the target object can ensure that notification messages are sent to the proper recipients.

Accesses to referenced values in objects other than the target object are "indirect" references. If the access is by indirect reference, the sequence of accesses required to obtain a desired value is an "access path". If an aspect computation expression involves an access path, then a change in any of the values in the path is detected as a change to the aspect value for notification purposes. If a change occurs in an access path, the notification requests for aspects no longer referenced must be canceled and new requests must be issued to the new aspects. When an aspect has a notification request, a request to cancel that request must cause cancellation of each of the supporting requests. Once a target aspect has one request, then no additional supporting requests need to be issued, and the supporting requests should only be canceled when the last target aspect request is removed.

Figure 5:
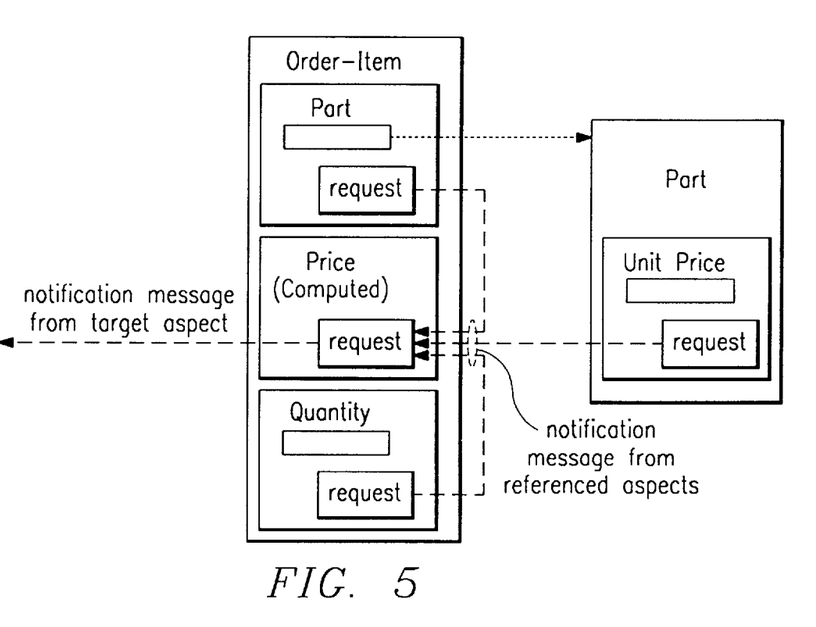
FIG. 5 illustrates an example of change notification for a computed aspect value.

FIG. 5 illustrates an example of notification for a computed value of an aspect, the Price of an Order-Item. Order-Item is an object with three aspects, Part, Price, and Quantity. Part is another object having a Unit Price aspect. The Price value in Order-Item is computed by multiplying the Unit-Price value from Part by the Quantity value on Order-Item. Thus, the computation expression used to compute Price references Part, Unit-Price, and Quantity.

The dashed arrows in FIG. 5 indicate notification messages. It is assumed that Order-Item has received a notification request for a change in Price. Thus, a notification request for change in Price is attached to the Price aspect. This request has generated three other requests for notification: on the Unit-Price aspect of Part, on the Quantity aspect of Order-Item, and on the Part aspect of Order-Item.

The notification requests on Unit-Price and Quantity are generated because they are used to compute the value of Price and are therefore referenced in the computation expression for Price. The notification request on the Part aspect of Order-Item is generated because Part is a link in the path to access Unit-Price. This is an example of an indirect reference. As indicated by the dotted arrow, Unit-Price must be retrieved from Part via the Part aspect of Order-Item.

As explained above in connection with indirect references, if a new Part were to be assigned to Order-Item, then the following will occur: a notification message will be generated to indicate the Part aspect change, this notification will cause another notification message to be generated for the change to Price, the notification request on the Unit-Price aspect of the old Part will be canceled, and a new notification request will be attached to the Unit-Price aspect of the new Part. The notification request on the Part aspect in the Order-Item object will remain the same because changes to this aspect are still of interest.

The above implementation of change notification is achieved with encapsulation of both the target object and its aspects. The requester is not concerned with whether the aspect is stored or computed. Nor does the object developer need to modify notification requests according to whether a value is stored or computed. In the example of FIG. 5, the Order-Item developer need only specify a computation on the Price aspect of an Order-Item. The programming language will generate the necessary code that will cause a notification request to Price to generate the notification requests to the aspects involved in the computation of Price.

Change Notification for Active Views

A feature of encapsulated aspects that is facilitated by the above-described change notification is the use of active views. A "view" is an abstraction for an object or object structure As is typical of views used in databases, a view may conceal some aspects and present a flattened representation of multiple related objects. An object view may also provide an interface that is not provided by the underlying object structure.

A "view" as used herein is an object that provides an interface to other objects. It has the ability to translate an interface, to provide an abstraction of a complex structure making it appear as a single object, to restrict access to its underlying objects, or to provide added functionality. A passive view simply responds to messages, using the underlying objects to incorporate their methods and aspect values.

An "active view" supports notification requests. More specifically, aspect values of views are "computed" in the sense that the view accesses its underlying objects for aspect values. If a view receives a notification request for a change in an aspect value, it sends a notification request to the underlying object from which that aspect value is derived. Then, this object will return a notification message to the view if a change occurs. Thus, by analogy to other objects, active views have aspects that handle notification requests for changes in their values in the same manner as described above for objects with computed aspect values.

Figure 6:
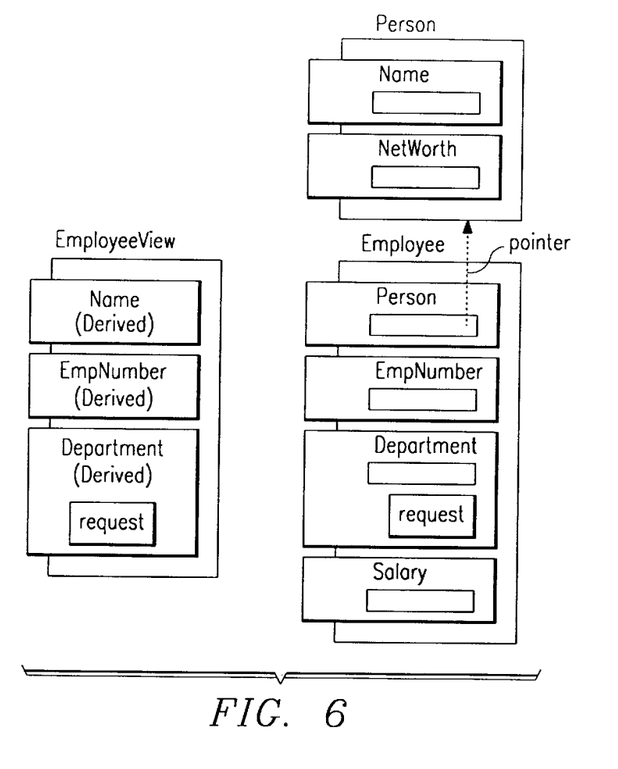
FIG. 6 illustrates an example of an active view that supports change notification.

FIG. 6 illustrates an example of an active view that provides an abstraction of underlying objects. The business model using this view represents employees and persons as separate classes, with Employee and Person objects, because a person can be an employee for several employers and can have other roles. A pointer in the Person aspect of Employee references the Person object. However, in certain applications, it might be convenient to represent the employee and the person as a single object, e.g., the EmployeeView object of FIG. 6.

The EmployeeView object has delegation methods, which can forward messages to the underlying objects, Person and Employee. EmployeeView aspects are derived from the underlying Employee and Person objects. When a message is sent to Employeeview, it may be forwarded to the Employee or Person object. Thus, the accessor methods of the view object invoke retrieval or update operations on the underlying objects.

The derivation of aspect values from underlying objects is analogous to computation of values referenced in a computation expression. In FIG. 6, EmployeeView has received a notification request for a change in the value of its Department aspect. A notification request is attached to the Department aspect of EmployeeView. Department values are derived from the Department aspect values of Employee. Thus, EmployeeView has forwarded the notification request to Employee and this notification request is attached to the Department aspect of Employee.

A number of applications might share a complex model. Any one application might use only a small portion of the underlying aspects. As the model is expanded to encompass a larger and larger representation of an enterprise, the size and complexity of objects and associated structures will require that applications interact abstractly through views. This permits each application to retain its simplicity. The underlying model can be extended and additional applications developed without the need to change existing views. In order for views to fully support these applications, they must be active views.

Views are especially useful for implementing system security. The user of a view may be restricted to only a subset of the data and functionality of the object structure. In the example of FIG. 6, an EmployeeView might exclude access to the employee's salary and bonus information. In a distributed environment, the principle object can remain on the server with local applications having access only to views.

Change Notification for Replicated Aspect Data of Shared Objects

Aspect encapsulation and change notification can be used to implement replication of objects. In a distributed computing environment, many client processes might interact with some of the same shared objects. In existing systems, a shared object will exist in one environment and a proxy object will appear in each of the other environments where it is referenced. The proxy object merely forwards messages to the shared object. The replication mechanism of the invention means that a shared object is replicated in different client environments. In other words, the same class and instance data occur in more than one place, making the proxy objects replicas of the shared object. The class of the proxy will not be exactly the same as that of the shared object because, as explained below, it must implement the dependence of the proxy object on the shared object for keeping values the same.

To achieve replication, a proxy of the shared object, which contains the instance variables from the shared object, is created in each of the client environments. Each proxy may include methods as well as stored aspect values. The aspect values of the shared object and its proxies are maintained as identical values. Thus, whenever the shared object or any of its proxies assign a new value to an aspect, the others are updated.

Notification is used to update the proxy(ies) if a value in the shared object changes. This is accomplished by sending a notification request from each proxy to the shared object. The notification request attaches to the aspect whose value is desired to be noticed. When an aspect value changes, the shared object generates a change notification message to the proxy.

Figure 7:
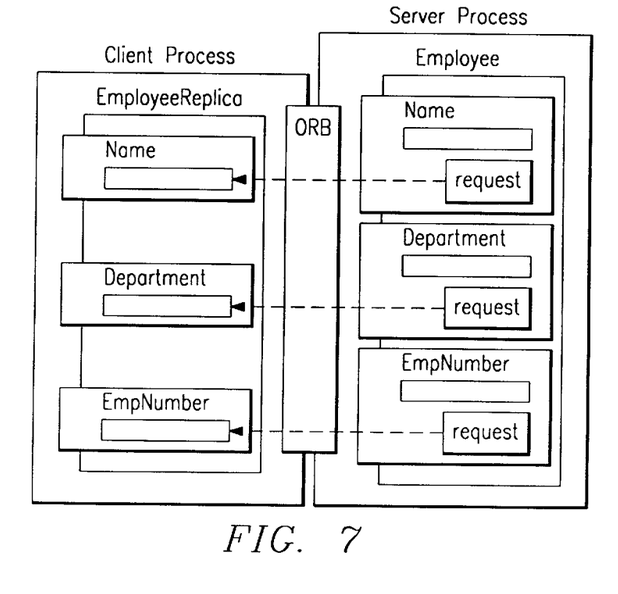
FIG. 7 illustrates an example of a shared object on a server linked to a proxy on a client, the proxy containing stored values replicated from the shared object where the replicated values are kept the same as the values of the shared object by means of change notification.

FIG. 7 illustrates an example of a shared Employee object on a server linked to a proxy on a client The dotted lines indicate proxy aspect values derived from aspect values in the shared object. The proxy as well as the shared object may execute methods against their local aspect values. Their states are kept the same by aspect assignment side effects on the proxy and by notification requests on the corresponding aspects of the shared object. Whenever there is a change in a value, it is communicated across an object request broker (ORB) to keep the other instances the same. The dashed lines indicate notification messages from the shared object to the proxy.

In this manner, a number of proxies can reference the same object, but the system developer need not anticipate this when designing objects. The replication can be extended so that a proxy can store computed values of the shared object as well as stored ones. An advantage of replication is the reduction of network traffic in a distributed computing system where different client environments interact with the same shared object.

Change Notification for Computed Aspect Values Stored in a Database

Encapsulated aspects and change notification provide the means to optimize database queries for computed aspects. In existing object-oriented databases, when the query criterion is a computed aspect, each of the objects referenced in the computation expression must be retrieved. However, using the above-described notification for computed values, computed values can be stored with the associated objects in the database to avoid this query overhead.

Whenever an object having an aspect with a computed value is to be stored in the database, the value can be computed first and stored with the object in the database. As a result, an externally stored database structure can include instance variables for aspects where the corresponding instance variables would not occur in the object in internal computer memory.

For example, an Engine object might have a Weight aspect, which is computed from the Weight values of EnginePart objects. The Weight aspect value can be computed and stored with Engine in the database. A query might ask for engines having a weight greater than a specified amount. Because Weight is stored, there is no need to retrieve the various EnginePart objects to get their Weight values.

Through notification, the object can be retrieved and updated if any of the referenced aspects changes. In the above example, the Engine object will send change notification requests to each of the EnginePart objects referenced in the computation expression for Weight. The notification requests will identify the appropriate Weight aspect on each EnginePart and a notification request will attach to that aspect. Then, when one of these computed values changes, the Weight object in the database will receive a change notification message. These features of aspects and notification are implemented by the database management system, with the functionality hidden from the programming language.

The determination of which computed aspects should have stored values then becomes a database performance tuning problem. For examples the frequency of use of Weight in queries is balanced against the frequency of notifying Weight when a Weight aspect value of EnginePart changes. Encapsulated aspects permit these tuning decisions to be made independently of object design and implementation.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An active view object for use in an object-oriented software system, comprising:

at least one aspect with a derived aspect value derived from an aspect in an underlying object;

an associated object protocol; and a method that complies with a notification request to said active view object for a change in said derived aspect value by generating a notification request to said underlying object.

2. A method of using an object-oriented programming language to define an active view object, for use in a computer system, comprising the steps of:

receiving a view object definition, said view object definition having an aspect with a derived aspect value derived from an aspect of an underlying object and having an associated object protocol; and generating programming code for a method associated with said view object such that a notification request to said view object for a change in said derived aspect value will generate a notification request to said underlying object.

3. A method of using object-oriented programming to provide change notification for an active view object having a derived aspect value that is derived from an aspect of an underlying object, for implementation on a computer system, comprising the steps of:

receiving a notification request to said view object requesting notice of a change in the value of said derived value;

sending a notification request to said underlying object; and attaching said notification request to said underlying object such that said underlying object will deliver a change notification message to said view object when a value of said aspect changes;

wherein the above steps use object protocols during execution of said object-oriented programming.

4. The method of claim 3, wherein said view object has methods for translating an interface.

5. The method of claim 3, wherein said view object has methods for providing an abstraction of a complex structure.

6. The method of claim 3, wherein said view object excludes access to aspect values of said underlying objects.

7. A method of using object-oriented programming to provide a shared object having one or more aspects, for implementation on a computer system, comprising the steps of:

creating at least one proxy object for said shared object in a client environment, said proxy having the same stored aspect values as said shared object;

providing said proxy object with a message protocol such that if said proxy object receives a notification request it then automatically sends a notification request to said shared object requesting notice of a change in a value of an aspect of said shared object; and attaching said notification request to said shared object such that said shared object will deliver a change notification message to said proxy object when said value changes, thereby causing said aspect value in said proxy object to be updated;

wherein the above steps use object protocols during execution of said object-oriented programming.

8. The method of claim 7, wherein at least one of said aspect values is a computed value, and further comprising the step of sending notification requests to each aspect used to obtain said computed value.

9. A method of using object-oriented programming to provide change notification of aspect values for implementation on a computer system that stores objects having at least one attribute aspect or at least one relationship aspect, comprising the steps of:

receiving a notification request from a requester object to a target object, wherein said notification request is the same for stored and computed aspect values of said target object;

if said aspect has a computed value, identifying the aspects used to compute said computed value, based on references in a computation expression; sending notification requests to any object, which may be one or more objects other than the target object, having aspects referenced in said computation expression; and attaching said notification requests to said objects having aspects referenced in said computation expression such that a change notification message will be delivered when a value used to compute said computed value changes;

wherein the above steps use object protocols during execution of said object-oriented programming.

10. The method of claim 9, wherein said attaching step is performed in a manner that permits said notification request to generate said notification messages.

11. The method of claim 9, wherein said software system is a compiled system and said identifying step is a result of identifying said computation expression during compilation.

12. The method of claim 9, wherein said software system is an interpreted system and wherein said computation expression is identified at run time.

13. The method of claim 9, wherein said requester object is the recipient of said change notification message.

14. The method of claim 9, wherein said notification request identifies an object other than said requestor object as the recipient of said change notification message.

15. The method of claim 9, wherein aspects referenced in said computation expression are indirectly referenced.

16. A method of using an object-oriented programming language to define an object, said object having at least one computed aspect value, for use in a computer system, comprising the steps of:

receiving an object definition, said object definition having at least one aspect with an aspect value computed by means of a computation expression and having an associated object protocol;

receiving a notification request for notice of a change in said aspect value, wherein said notification request is the same for stored and computed values; and generating programming code for a method associated with said object such that said notification request will generate a notification request to any aspect used in said computation expression, said generating step being performed by identifying the aspects used to compute said computed value, based on references in a computation expression; sending notification requests to other objects having aspects referenced in said computation expression; and attaching said notification requests to said objects having aspects referenced in said computation expression such that a change notification message will be delivered when a value used to compute said computed value changes.

17. An object for use in an object-oriented software system, comprising:

at least one aspect, said aspect representing an attribute or relationship of said object, and said aspect having a value computed by means of a computation expression;

an associated object protocol; and a method that complies with a notification request to said object for a change in said computed aspect value by generating a notification request to aspects used in said computation expression, wherein said method has means for identifying the aspects used to compute said computed value, based on references in a computation expression; sending notification requests to other objects having aspects referenced in said computation expression; and attaching said notification requests to said objects having aspects referenced in said computation expression such that a change notification message will be delivered when a value used to compute said computed value changes.

\* \* \* \* \*